Patented Sept. 7, 1937

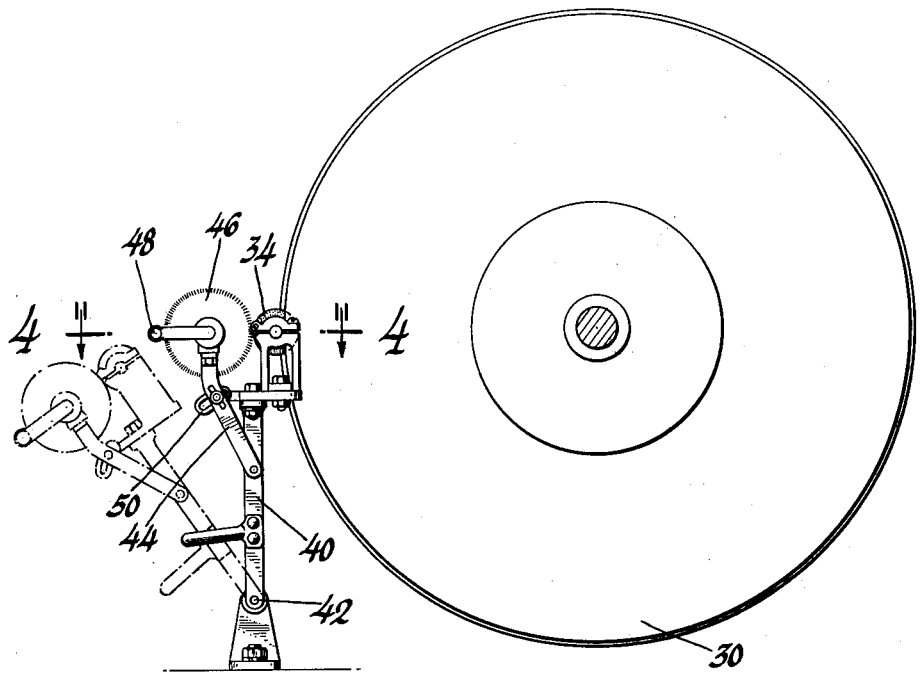
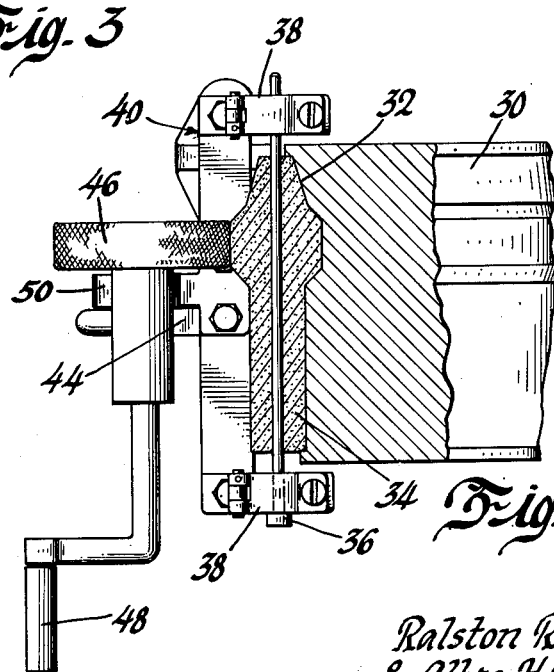

2,091,973

UNITED STATES PATENT OFFICE 2,091,973

APPARATUS FOR MAKING CERAMIC ARTICLES

Albra H. Fessler and Ralston Russell, Jr., Flint, Mich., assignors to General Motors Corporation, Detroit, Mich., a corporation of Delaware Application June 27, 1935, Serial No. 28,630

10 Claims. (Cl. 25—45)

This invention has to do with method and apparatus for forming bodies out of ceramic material, either plastic or non-plastic. The invention is of especial advantage in forming bodies from non-plastic mixes. The process is superior to prior methods used in handling such compositions, such as casting, dry-forming, etc., in that it is rapid, requires but little equipment, and produces a product of uniform density with a low percentage of rejections, and is therefore well adapted for economical manufacture.

According to the method the raw material, preferably in the form of dust aggregated so that it will flow freely, is supplied to the die cavity in a mold having walls of yieldable material. The mold is confined in a press and heavy pressure is applied to one or more of the yieldable walls of the mold, causing the mold to close in on the material in the die cavity compressing it to a shape corresponding to that of the cavity but of reduced size. The pressure applied is so great as to cause coherence of the material even though its plasticity be of such low order as to make it incapable of being formed by any of the known plastic methods. Upon release of the pressure the mold returns to its original shape thereby detaching itself from the formed body and permitting the latter to be readily removed.

An important feature of my invention consists in the employment of a mold of solid yieldable material, preferably rubber. This material possesses the characteristics of a fluid under heavy pressure and so transmits substantially uniform pressure to all parts of the ceramic material in the mold, producing a body of uniform density. The molds are simple and durable and the die cavities in them may be given a variety of shapes.

The formed bodies may, if desired, be given a finishing operation as by turning or grinding. Thereafter the bodies are fired preferably at temperatures sufficiently high to sinter the particles into a dense body without destroying its shape. The method has been especially useful in forming bodies of high refractory non-plastic materials requiring temperatures on the order of Seger cone 30 to produce sintering.

Owing to the uniform density in the formed body the fired product is dense, homogeneous and free from the structural weaknesses which are so common in non-plastic bodies formed by prior methods.

In the drawings:

Figure 3 is a side view of apparatus for grinding the formed bodies to final shape.

Figure 4 is a horizontal section on line 4—4 of Figure 3.

Figure 1:
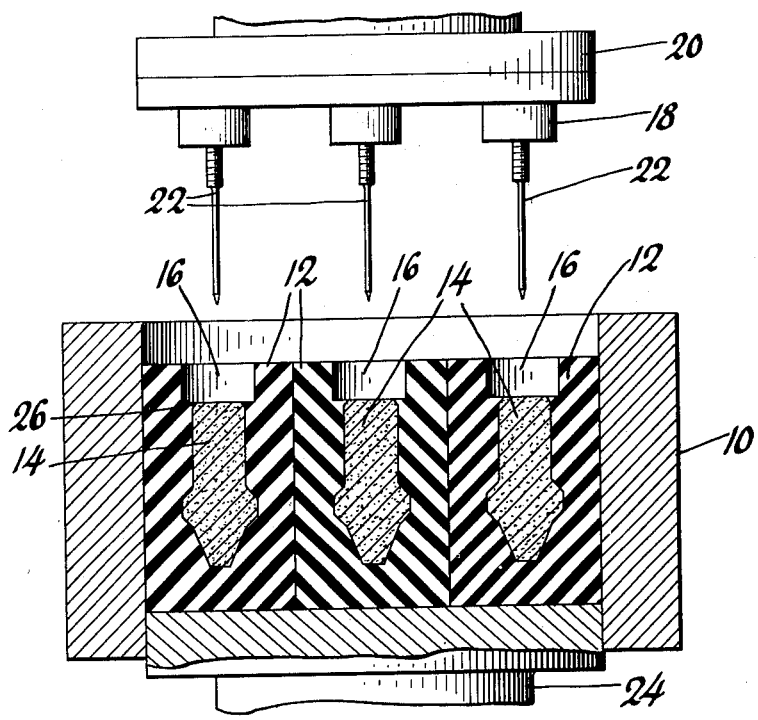
Figure 1 is a diagrammatic sectional view through a press equipped with molds in accordance with the invention showing the relation of the parts prior to the pressing operation.

The process will be described by way of example, in its application to the forming of spark plug insulator bodies from alumina, although it is equally applicable to the forming of bodies from a great variety of non-plastic as well as plastic compositions.

The ceramic material is preferably used in the form of dust. The dust should be in such form as to have good flowing qualities so that in commercial production it will not cake or clog the feeding apparatus. The size of the particles should be fairly fine in order to promote vitrification during firing.

The raw material is preferably ground to a fine powder by any of the usual methods, and either wet or dry. Since the dust thus obtained will, in general, not possess the desired flow characteristics it is desirable to add to it a small percentage of water, on the order of from 2 to 10% or to use a like quantity of a bonding solution such as dextrin or gelatin. If preferred the dust and bonding agent may be mixed dry, and water may be added to the dry mixture.

The resulting material lacks the desired flow characteristics, tending to cake badly so that it will usually be found to be desirable to so treat the material as to form aggregates of the particles, these aggregates possessing good flow characteristics. This may be done by rubbing the damp material through a coarse screen, e. g. 14 mesh, and thereafter either partially or completely drying it.

Another method of producing aggregated material consists in spray drying slip made out of it. Thus the ground raw material and bond may be mixed with enough water to make a slip of low viscosity and fairly high specific gravity. Electrolytes, such as hydrochloric acid, aluminum chloride and sodium citrate are sometimes used in order to produce a slip of the desired weight and viscosity. In the case of alumina, hydrochloric acid is most effective. The prepared slip is sprayed by a standard nozzle type spray gun into a heated drier, whereupon the water is evaporated and the small particles are aggregated, settling to the drier floor. The drying is preferably regulated so that the aggregated particles contain a little moisture, preferably on the order of 5% as this promotes cohesion of the particles in the molding operation. The resulting material will be found to have the desired flow characteristics.

In considerable work in the preparation of aggregated material for use in the process we have found that the use of acid treated slip is, in general, desirable. However, we have found that aggregation is also promoted by the addition to the slip of certain organic agents such as dextrin, gelatin, saponin, paraffin, wheat flour and natural gums. In the case of alumina, dextrin was found to be most effective. The use of electrolytes such as aluminum chloride, sodium citrate and ammonium citrate produces slips which spray dry very satisfactorily. The use of clay or bentonite in the slip appears undesirable, although the undesirable effects may be reduced by deflocculating the clay with an electrolyte.

The drying of the slip is preferably controlled so that the aggregated particles contain a little moisture, preferably on the order of 5%, as this is advantageous in pressing, grinding to shape and vitrification of the fired ware. Water in excess of 10% opposes satisfactory vitrification.

Figure 2:
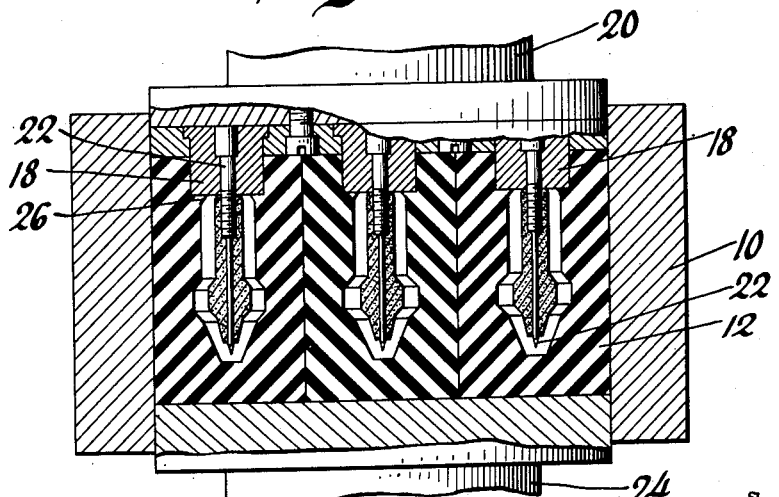
Figure 2 is a similar view showing the relation of parts after the release of pressure on the molds.

Figures 1 and 2 show the method of forming the bodies. 10 indicates a steel mold box containing molds 12 of yieldable material, preferably rubber. The molds contain die cavities filled with the ceramic material indicated at 14. 16 indicates extensions of the die cavities adapted to receive inserts 18 secured to plunger 20. The inserts 18 carry pins 22, the upper ends of which are preferably threaded, these pins forming the center wire aperture in the blank as shown in Figure 2. The molds 12 rest on the lower plunger 24.

Figure 2 shows the parts after the forming operation and with the molds relieved of the forming pressure. It will be obvious that during the pressing operation the rubber, being unable to escape from the mold box, closes in on the ceramic material forming it into a compact mass of the shape shown in Figure 2. The pressure exerted by the rubber on the ceramic material is substantially the same over the whole surface of the body because under the heavy pressures used, on the order of 1,000 lbs. per square inch and upward the rubber has flow characteristics analogous to those of a liquid. As a consequence the formed bodies are found to have substantially uniform density throughout.

It will be apparent that following the pressing operation the plunger 20 is separated from the molds, and thereafter the formed bodies may be removed from the pins 22 by unscrewing them.

The pressing operation is capable of a good deal of modification. Both plungers 20 and 24 may be made movable, if desired, or one of them, preferably 24, may be made integral with mold box 10. In practice we have preferred to move the plunger 24 and the mold box 10 together toward the plunger 20, but however this be arranged the pressure is actually applied on all six sides of the rubber mold as soon as the plunger moves enough to place the rubber under compression.

We have found it desirable to maintain a relatively low ratio of mold cavity volume to volume of the rubber, preferably on the order of one to three so as to prevent excessive flow of the rubber since this has a tendency to produce cracking of the bodies.

We have found it to be desirable to have all variations in cross section of the mold cavity made gradually and not abruptly. Hence the tapered tip. We have also found it desirable to provide at the upper end of the die cavity an inturned flange 26 on the rubber mold, since the rubber is here somewhat restrained from flow by the friction between it and the die inserts 18. The excess material makes up for this variation.

It has proven to be very desirable to have rubber at the bottom of the die cavity as well as at the sides since otherwise there is likely to be cracking of the bodies. The rubber above and below the die cavities seems to act as a reservoir equalizing the flow throughout the mold. We have found that one-half inch of rubber is usually sufficient for the bottom of the mold.

While it is possible to make the molds in multiple units, we have preferred to make them in single units, assembled as shown for reasons of economy.

In the pressing operation it has been found immaterial how swiftly the pressure is applied, but it has been found to be desirable to release the pressure on the mold somewhat slowly to prevent production of cracks.

We have found the use of the die insert in the end of the cavity to be desirable in the forming of such articles as spark plug insulators. The insert holds the center wire securely, and the cavity which receives it provides for the reservoir of rubber at the upper end of the mold.

We have found it desirable to use a layer of paper between the surface of the insert and the ceramic material, or to coat the surface with oil to prevent the material from adhering to it.

The rubber used for the mold should be reasonably soft, and at the same time tough enough to withstand continued use. However, we have found medium grades satisfactory.

The bodies formed by pressing may, if desired, be ground to provide a somewhat truer shape. If a bonding material has been used which hardens on drying it may be desirable to first dry the pieces so that they will better withstand the grinding operation.

Grinding may be done on equipment such as shown in Figures 3 and 4. Here 30 indicates a grinding wheel having its periphery ground as indicated at 32 to the shape desired for the insulator shown at 34. The insulator 34 is mounted on a spindle 36 held in readily releasable bearings shown at 38 carried by frame 40 pivoted at 42. 44 indicates an arm pivoted to bracket 40 carrying the felt wheel 46 adapted to be rotated by handle 48. The felt wheel, in engagement with the insulator as shown in Figure 4, is rotated by the handle 48 so as to drive the insulator 34 in a direction preferably opposite to the direction of rotation of the grinding wheel 30 to facilitate the grinding action. The position of the felt wheel 46 may be adjusted by the lock nut and slotted bracket indicated at 50. Any other suitable means may be used in the grinding operation, or, if preferred, turning may be resorted to.

The formed and shaped bodies are then fired in a kiln to suitable temperatures. In the case of bodies made out of alumina or other highly refractory materials high temperatures on the order of Seger cone 30 and upward are required to produce sintering. The sintered bodies will be found to be dense, homogeneous and free from structural weakness. With such bodies it will be found that firing technique is not nearly as critical as in the case of clay bonded bodies so that by this method of forming together with high temperature firing it is possible to produce insulators and other objects out of materials not heretofore available for this purpose. The resulting insulators possess superior physical characteristics, and are usually characterized by a glassy surface, especially where very finely ground material has been employed.

We have found that in the case of the non-plastic materials with which we have dealt, forming pressures on the order of 1,000 pounds per square inch and upward are necessary. We have successfully used pressures as high as 25,000 pounds per square inch. It will be found desirable to employ non-plastics of a grain size not larger than on the order of 43 microns in order to secure most satisfactory bodies on firing. Obviously, of course, the pulverized material will consist of a mixture of particles of various grain sizes.

We claim:

1. A press for molding ceramic objects and the like comprising a mold retainer open on one side, a solid mold of yieldable material having flow characteristics under pressure confined within the retainer and having a die cavity opening on said side of the retainer, and a movable closure adapted to close the open side of the retainer and said cavity, and means for producing relative movement between the closure and the retainer to apply pressure to the yieldable material to cause it to flow into the cavity in the die.

2. In the press as claimed in claim 1, said mold having an inturned flange surrounding the open end of the die cavity to compensate for reduced flow of the portion of the mold material in engagement with the closure.

3. The combination as defined in claim 1, said closure being provided with means extending into the die cavity in the closed position thereof.

4. The combination of a self-sustaining mold made of material having flow characteristics under pressure, said mold having a cavity therein, a passage leading through the mold wall to said cavity, a removable closure for said passage, means for applying pressure to the mold to cause the material thereof to flow toward the cavity to compress the material placed therein, the said passage being of a size to permit withdrawal of the compressed body therethrough.

5. In the combination as defined in claim 4, means carried by said closure for supporting the compressed body.

6. In the combination as defined in claim 4, a support carried by said closure and extending into the mold cavity.

7. The combination as defined in claim 4, and a supporting element carried by said closure and extending into the mold cavity, said element being of greater length than the cavity when under compression so as to penetrate through the compressed body.

8. The combination as defined in claim 4, and a threaded supporting means carried by said closure and extending into the cavity in the mold to form a threaded bore in the compressed body.

9. The combination of a mold retainer comprising relatively movable parts, a self-sustaining mold confined in said retainer, said mold being made of material having flow characteristics under pressure, said mold having a cavity therein, a passage leading through the mold wall to said cavity, a closure for said passage, means for producing relative movement of one of the parts of the retainer with respect to the remainder of the retainer to compress the mold and cause it to compress material placed in the cavity therein.

10. The combination as defined in claim 9, and a support for the molded material carried by said closure and extending into said cavity.

ALBRA H. FESSLER.
RALSTON RUSSELL, Jr.